United States Patent
Mjogeman et al.

(10) Patent No.: US 9,467,951 B2
(45) Date of Patent: Oct. 11, 2016

(54) UPLINK TRANSMIT POWER CONTROL

(75) Inventors: Marc Mjogeman, Gothenburg (SE);
Anders Lamm, Molndal (SE); Magnus Nilsson, Gothenburg (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 17 days.

(21) Appl. No.: 14/406,219

(22) PCT Filed: Jun. 29, 2012

(86) PCT No.: PCT/EP2012/062678
§ 371 (c)(1),
(2), (4) Date: Dec. 7, 2014

(87) PCT Pub. No.: WO2014/000809
PCT Pub. Date: Jan. 3, 2014

(65) Prior Publication Data
US 2015/0156727 A1 Jun. 4, 2015

(51) Int. Cl.
*H04B 7/00* (2006.01)
*H04W 52/14* (2009.01)
*H04W 52/24* (2009.01)
*H04W 52/52* (2009.01)

(52) U.S. Cl.
CPC ......... *H04W 52/146* (2013.01); *H04W 52/241* (2013.01); *H04W 52/245* (2013.01); *H04W 52/52* (2013.01)

(58) Field of Classification Search
CPC . H04W 52/24; H04W 52/50; H04W 52/367; H04W 52/12; H04W 52/40
USPC ........ 455/522, 68, 69, 127.1, 508, 509, 507, 455/515, 445, 67.11, 403, 422.1, 550.1, 455/500, 517, 423–425, 466; 370/252, 318, 370/329, 328, 338, 343
See application file for complete search history.

(56) References Cited

U.S. PATENT DOCUMENTS

| | | |
|---|---|---|
| 2004/0166884 A1 | 8/2004 | Oh et al. |
| 2006/0025087 A1 | 2/2006 | Nilsson |
| 2011/0105174 A1* | 5/2011 | Pelletier .............. H04W 52/367 455/522 |

FOREIGN PATENT DOCUMENTS

| | | |
|---|---|---|
| WO | 03/019813 A1 | 3/2003 |
| WO | 2011/038761 A1 | 4/2011 |

OTHER PUBLICATIONS

PCT International Search Report, mailed Dec. 7, 2012, in connection with International Application No. PCT/EP2012/062678, all pages.
PCT Written Opinion, mailed Dec. 7, 2012, in connection with International Application No. PCT/EP2012/062678, all pages.

* cited by examiner

*Primary Examiner* — Keith Ferguson
(74) *Attorney, Agent, or Firm* — Leffler Intellectual Property Law, PLLC

(57) ABSTRACT

The embodiments herein relate to a method in a base station for transmitting an UpLink Transmit Power Control, UL TPC, command to a user equipment in a communications network. The base station obtains a measurement of a distortion of a signal received from the user equipment. The signal is associated with a power to be controlled. The base station determines that the signal is unreliable if the distortion measurement is above a threshold or determining that the signal is reliable if the distortion measurement is below the threshold. The base station transmits a first UL TPC command to the user equipment when the signal is determined to be unreliable or transmits a second TPC command to the user equipment when the signal is determined to be reliable.

10 Claims, 5 Drawing Sheets

UPLINK TRANSMIT POWER CONTROL

TECHNICAL FIELD

Embodiments herein relate generally to a base station and a method in the base station. More particularly the embodiments herein relate to transmitting an UpLink Transmit Power Control (UL TPC) command to a User Equipment (UE) in a communications network.

BACKGROUND

In a typical communication network, also referred to as a communication system, wireless communication system or wireless communication network, user equipments communicate via a Radio Access Network (RAN) to one or more core networks (CNs).

A user equipment is a device by which a subscriber may access services offered by an operator's core network and services outside operator's network to which the operator's radio access network and core network provide access, e.g. access to the Internet. The user equipment may be any device, mobile or stationary, enabled to communicate over a radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or Personal Computer (PC). The user equipment may be portable, pocket-storable, hand-held, computer-comprised, or vehicle-mounted mobile devices, enabled to communicate voice and/or data, via the radio access network, with another entity, such as another user equipment or a server.

User equipments are enabled to communicate wirelessly with the communications network. The communication may be performed e.g. between two user equipments, between a user equipment and a regular telephone and/or between the user equipment and a server via the radio access network and possibly one or more core networks and possibly the Internet.

The communications network covers a geographical area which may be divided into cell areas, and may therefore also be referred to as a cellular network. Each cell area is served by a Base Station (BS), e.g. a Radio Base Station (RBS), which sometimes may be referred to as e.g. NodeB, B node, or Base Transceiver Station (BTS), depending on the technology and terminology used. The base stations communicate over the air interface with the user equipments within range of the base stations. The base station is referred to as BS in some of the drawings.

In the user equipment and/or the base station, a received radio signal is converted from the analogue domain to the digital domain before further baseband signal processing is performed. In most digital signal processing systems, upon reception of a digital signal, the first stage of processing is to compress the received signal by means of a Digital Automatic Gain Control (DAGC). The reason for compressing the incoming signal is to decrease the amount of processing cycles and memory needed (in the baseband domain), and thus in the end reduce the hardware cost and power consumption.

If signals input to the DAGC changes faster than the DAGC is designed for, the compressed output signal will be distorted and information will be lost during the processing.

In a (Wideband) Code Division Multiple Access system, abbreviated (W)CDMA, W-CDMA or WCDMA, a distorted signal will result in a degraded performance of the received signal quality.

According to the Third Generation Partnership Project (3GPP), "W-CDMA is a spread-spectrum modulation technique; one which uses channels whose bandwidth is much greater than that of the data to be transferred. Instead of each connection being granted a dedicated frequency band just wide enough to accommodate its envisaged maximum data rate, W-CDMA channels share a much larger band. The modulation technique encodes each channel in such a way that a decoder, knowing the code, may pick out the wanted signal from other signals using the same band, which simply appear as so much noise".

A key feature in a (W)CDMA system is fast transmit power control often referred to as Inner Loop Power Control (ILPC). The ILPC is a feedback loop between the user equipment and the base station aiming to keep the received signal to noise level, i.e. Signal to Interference Ratio (SIR), at a constant level. This is done by one or more TPC commands, which indicates a reduction or an increase of the power. The ILPC may be in the downlink or in the uplink. In the uplink, ILPC refers to the ability of the user equipment to adjust its output power in accordance with one or more TPC commands received in the downlink, in order to keep the received uplink SIR at a given SIR target. In the downlink, the ILPC refers to the ability of the base station to adjust its output power in accordance with one or more TPC commands received in the uplink. Uplink may be defined as a transmission from the user equipment to the base station and downlink may be defined as a transmission from the base station to the user equipment.

SIR is commonly used as a way to measure the quality of wireless connections. SIR is calculated as SIR=P/(I+N) where P is signal power, I is interference power and N is noise power.

When the input signal to a DAGC is fairly uniform the amount of signal distortion due to the DAGC may be low. But as the uniform distribution is altered, the amount of distortion is increased.

TPC is an abbreviation for Transmit Power Control or Transmit Power Commands and is used in order to prevent too much unwanted interference between network cells and user radio links in a WCDMA radio access network. Cell power is a shared resource in WCDMA and abundant power is undesired. In general for any radio access network, the power control enables reduced energy consumption. The UL TPC mechanism dynamically adjusts the UL transmission power. For each radio link, the uplink inner loop power control continuously adjusts the transmit power of the user equipment in order to keep the received uplink SIR substantially at a given SIR target. Each radio link comprises an UL and a DL. The UL carries TPC commands to control DL power (this is called DL TPC in this document). The DL carries TPC commands to control UL power (this is called UL TPC in this document).

Efficient power control is crucial in a (W)CDMA communications network in order to minimize interference between radio channels in the network. Power control ensures that each user equipment receives and transmits just enough energy to properly convey information while interfering with other user equipment's no more than necessary.

Due to increase of packet switched data in (W)CDMA systems today, the input power of the received signal may rapidly change and the DAGC may suffer of more distortion.

The received signal comprises both user data and control data. When the received signal is distorted, both the user data and the control data will also be distorted. Distortion of user data normally only leads to degraded performance for that specific user equipment, but distortion of control data may lead to errors in the ILPC feedback loop. Errors in the ILPC feedback loop affect not only the specific user equipment but all user equipments in the system as the SIR cannot be kept at the desired level.

When a user equipment has a SIR larger than a target value the ILPC should send a TPC command indicating power down. The SIR of the user equipment is measured as received power divided by noise power. When the received signal is distorted due to errors in the DAGC, the estimation of the received power may be too low, and thus the estimated SIR is also too low. If the error is large enough, the estimated SIR may be lower than the target value instead of larger than the target value. In this case the resulting TPC command will indicate power up instead of power down.

As increased power may lead to even higher distortion the problems may continue with the result that the transmitting equipment ends up transmitting at its maximum power. This phenomenon is often referred to as a power rush.

Power rushes are severe in the communications network since they may lead to increased interference or noise for other user equipments, and the accessibility and retainability of the communications network is decreased.

Upcoming WCDMA features are expected to increases the probability and amount of distortion and errors.

SUMMARY

An objective of embodiments herein is therefore to obviate at least one of the above disadvantages and problems, and to provide improved power control in the communications network.

According to a first aspect, the object is achieved by a method in a base station for transmitting an UL TPC command to a user equipment in a communications network. The base station obtains a measurement of a distortion of a signal received from the user equipment. The signal is associated with a power to be controlled. The base station determines that the signal is unreliable if the distortion measurement is higher than a threshold or determines that the signal is reliable if the distortion measurement is lower than the threshold. The base station transmits a first UL TPC command to the user equipment when the signal is determined to be unreliable or it transmits a second TPC command to the user equipment when the signal is determined to be reliable.

According to a second aspect, the object is achieved by a base station configured to transmit an UL TPC command to the user equipment in the communications network. The base station comprises a processor which is configured to obtain a measurement of a distortion of a signal received from the user equipment. The signal is associated with a power to be controlled. The processor is further configured to determine that the signal is unreliable if the distortion measurement is higher than a threshold or to determine that the signal is reliable if the distortion measurement is lower than the threshold. The base station comprises a transmitter which is configured to transmit a first UL TPC command to the user equipment when the signal is determined to be unreliable or to transmit a second TPC command to the user equipment when the signal is determined to be reliable.

Since the reliability of the signal is evaluated, improved power control in the communications network is obtained.

Embodiments herein afford many advantages, of which a non-exhaustive list of examples follows:

An advantage of the embodiments herein is that the system stability is preserved. The embodiments herein reduce the power consumption and they reduce the interference in the network.

Another advantage of the embodiments herein is that they increase the throughput and quality of the communications system.

Another advantage of the embodiments herein is that they keep the received signal to noise level at a substantially constant level.

Furthermore, another advantage of the embodiments herein is that they improve the communications network behaviour by increased cell throughput, accessibility and retainability.

Another advantage of the embodiments herein is that by estimating the distortion from the DAGC, the reliability of the TPC commands may be selected and thus the power stability of the network is preserved.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
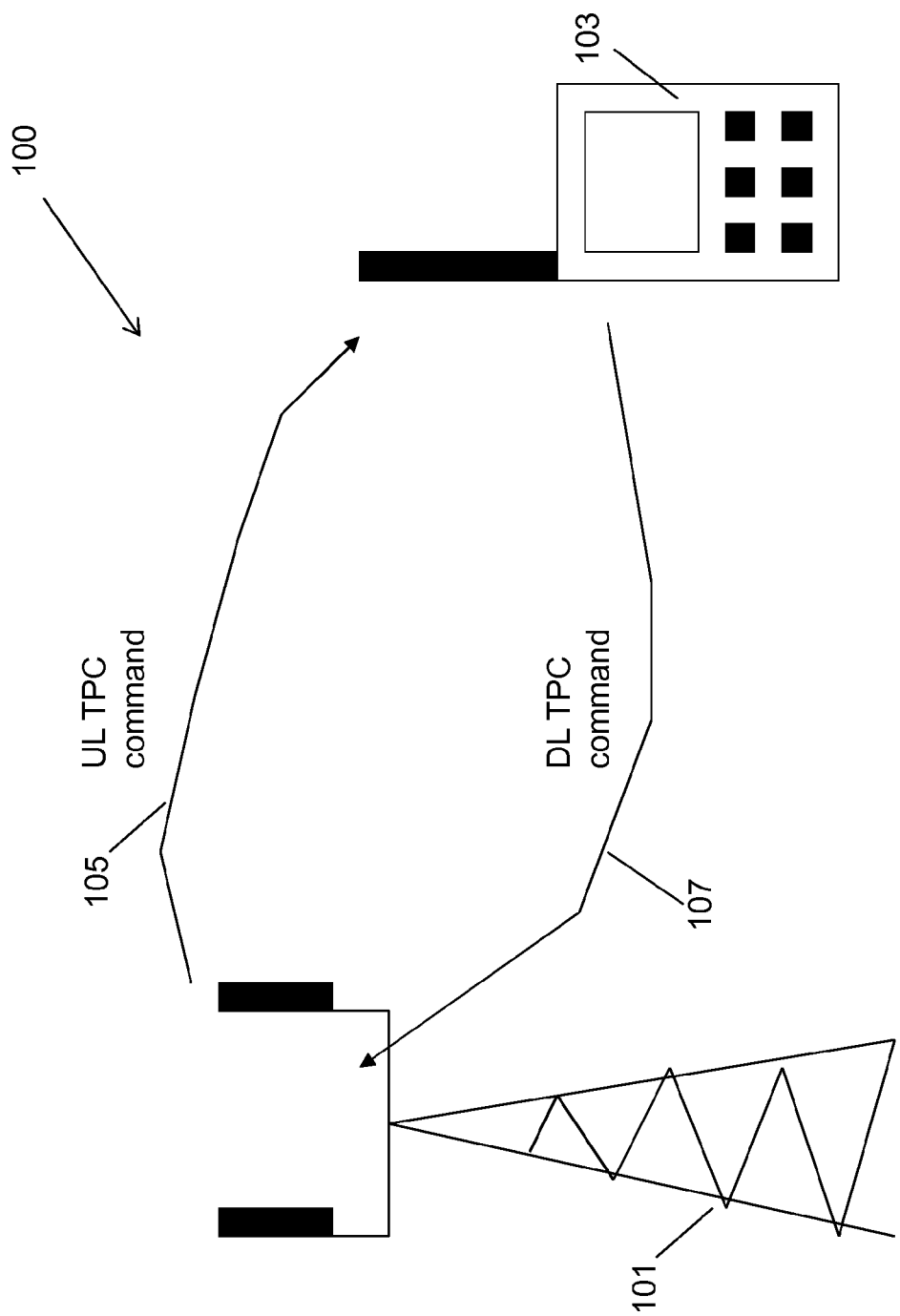
FIG. 1 is a schematic drawing illustrating an embodiment of a communications network.

FIG. 1 depicts a communications network 100 in which embodiments herein may be implemented. The communications network 100 may in some embodiments apply to one or more radio access technologies such as for example Code Division Multiple Access (CDMA), Wideband Code Division Multiple Access (WCDMA) or any other Third Generation Partnership Project (3GPP) radio access technology or other radio access technologies.

The communications network 100 comprises a base station 101 serving a cell. The base station 101 may be a base station such as a NodeB, BTS or any other network unit capable to communicate over a radio carrier with a user equipment 103 being present in the cell.

The user equipment may be any device, mobile or stationary, enabled to communicate over a radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or PC. The user equipment 103 is referred to as UE in some of the figures. As illustrated in FIG. 1, the base station 101 transmits an UL TPC command 105 to the user equipment 103 on the downlink, and the user equipment 103 transmits a DL TPC command 107 to the base station 101.

Figure 2:
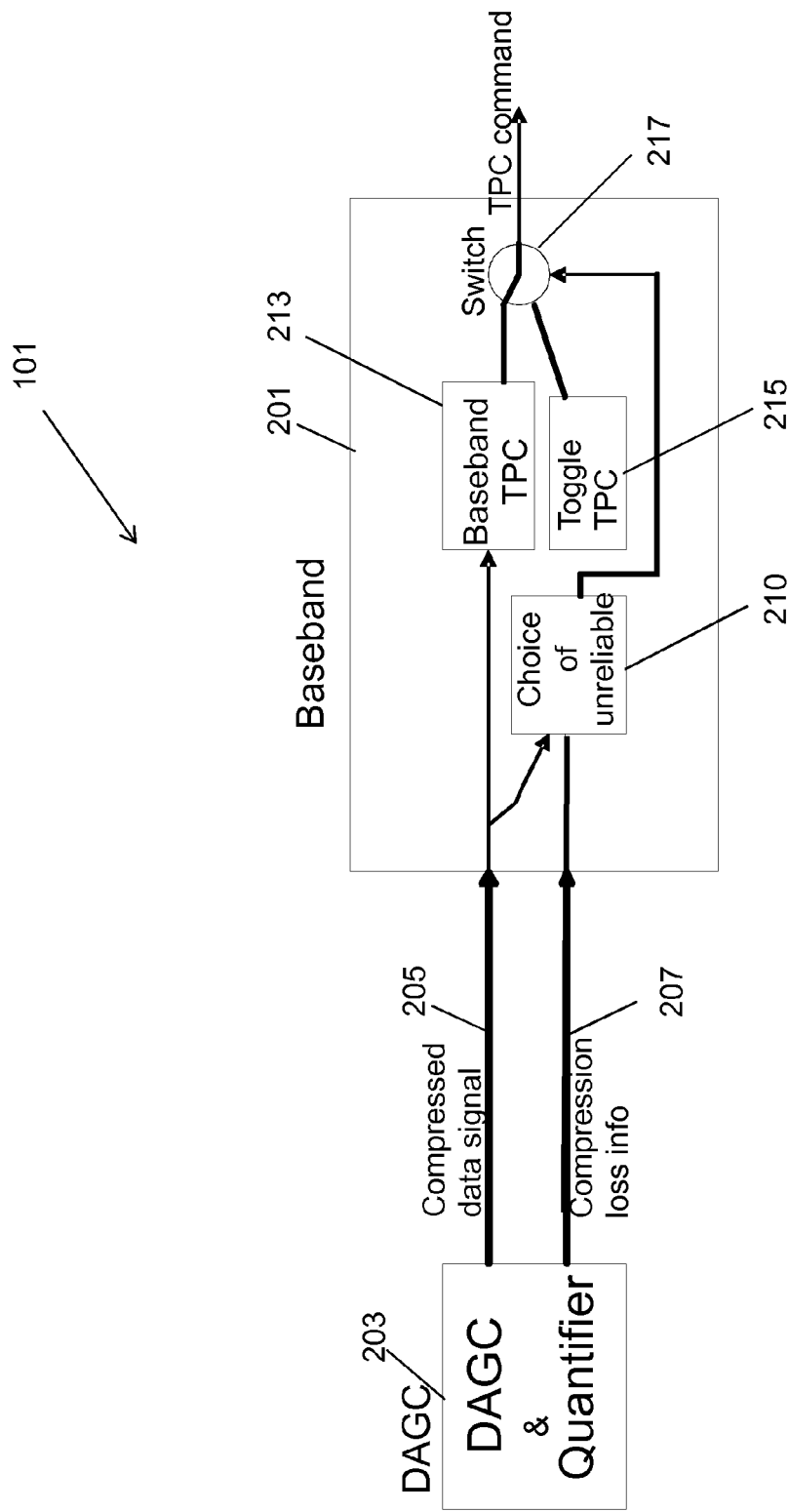
FIG. 2 is a schematic block diagram illustrating embodiments of a base station.

FIG. 2 illustrates an example embodiment of the base station 101. The base station 101 exemplified in FIG. 2 comprises a baseband unit 201 and an DAGC 203. Compressed data signal 205 and compression loss information 207 is transmitted from the DAGC 203 to the baseband unit 201. Based on the compressed data signal 205 and the compression loss information 207, the baseband unit 201 makes a choice of reliability 210 of the compressed data signal 205, i.e. whether the DAGC 203 is configured to handle the speed with which the input signal changes or not. The estimate of the reliability of the compressed data signal controls if the TPC command should be the baseband estimated TPC command 213 or a toggling TPC command 215. The term toggling in the toggling TPC command 215 refers to alternating between at least two different TPC commands, e.g. alternating between 0 and 1, i.e. power down and power up. The purpose of the switch 217 in FIG. 2 is to illustrate the switch between the baseband TPC command 213 and the toggling TPC command 215. The output of the baseband unit 201 is the TPC command, which is either baseband estimated or toggled.

The DAGC 203 is typically employed at systems where the amplitude of an incoming signal varies over a wide dynamic range. The role of the DAGC circuit is to provide a relatively constant output amplitude so that circuits following the DAGC circuit require less dynamic range. If the signal level changes are much slower than the information rate comprised in the signal, then a DAGC circuit may be used to provide a signal with a well-defined average level to downstream circuits. In most system applications, the time to adjust the gain in response to an input amplitude change should remain constant, independent of the input amplitude level and hence gain setting of the amplifier.

By estimating the distortion from the DAGC 203 the reliability of the TPC commands may be selected and thus the power stability of the system may be preserved. This improves the network 100 behavior by increased cell throughput, accessibility and retainability.

In the following, two embodiments for estimating the amount of distortion will be described.
1. The amount of distortion is measured in the DAGC 203 and reported to the signal processing circuit of the baseband unit 201.
2. The amount of distortion is estimated in the receiver circuits of the baseband unit 201 by estimating the number of saturated sample values.

The number of saturated sample values is estimated by identifying any deviations in the distribution of the received signal, as compared to the distribution of an expected non-distorted signal.

By comparing the estimated distortion to a threshold value the reliability of the estimated SIR is given, done in the unit choice of reliability 210 in FIG. 2.

If the SIR is considered reliable, the TPC command is sent to the transmitting equipment. If the SIR is considered unreliable the inner loop power control algorithm is modified with an exemption handling until a reliable SIR value is achieved.

The method for transmitting an UL TPC command to the user equipment 103 in the communications network 100 according to some embodiments will now be described with reference to the combined signalling diagram and flowchart depicted in FIG. 3. The method comprises the following steps, which steps may as well be carried out in another suitable order than described below.

Step 301

The user equipment 103 transmits a signal to the base station 101.

Step 302

The base station 101 estimates the distortion of the signal transmitted from the user equipment 103. The distortion may be estimated in several alternative embodiments.

In one alternative embodiment, the DAGC 203 performs the estimation of the distortion of the received signal. When the distortion is estimated, compression loss information is obtained. The compression loss information is estimated by comparing power measurements of the transmitted signal prior to DAGC compression with a power measurement after DAGC compression. The time interval between each estimation of compression loss information may be set by a parameter. A typical value in case of WCDMA may be a time slot basis, i.e. 667 μs. After the DAGC 203 has estimated the distortion of the received signal, it transmits information about the distortion to the baseband unit 201.

In another alternative embodiment, the distortion is estimated in the baseband unit 201 of the base station 101. When the power distortion estimation is made in the baseband unit 201, the following two alternative embodiments are possible:
  Alternative I: The baseband unit 201 measures the number of saturated samples per time interval, typically 1 time slot,
  Alternative II: The baseband unit 201 measures the average power per time interval, for example 1 time slot, and compares if it is larger than a threshold. If the mean power is larger than the threshold, the probability of having many saturated samples is high. Thus, the SIR is also here considered as unreliable for the upcoming time interval.

Step 303

When the base station 101 has estimated the distortion of the received signal, i.e. the compression loss information, the base station 101 determines the reliability of the signal based on the distortion. This impacts the inner loop power control of the base station 101.

If the estimation of the distortion was performed in the DAGC 203, the base station 101 compares the estimated distortion with a threshold. If the estimated distortion is higher than the threshold, the base station 101 determines that the signal is unreliable. If the estimated distortion is lower than the threshold, the base station 101 determines that the signal is reliable.

If the estimation of the distortion was performed as in the baseband unit 201, alternative I), the base station 101 compares the measured number of saturated samples per time interval to a threshold level. If the number of saturated samples is above a given threshold the SIR is considered unreliable for the upcoming time interval.

If the estimation of the distortion was performed as in the baseband unit 201, alternative II), the base station 101 compares the measured average power per time interval with a threshold. If the average power is larger than the threshold, the probability of having many saturated samples is high. Thus, SIR is also here considered as unreliable for the upcoming time interval.

Step 304

If step 303 results in that the received signal is reliable, the base station 101 transmits the ordinary UL TPC commands to the user equipment 103. Ordinary UL TPC commands means that no predetermined TPC commands are sent to the user equipment 103, but the base station 101 trusts that the ordinary power control algorithm is running and generates UL TPC commands to the user equipment 103. The base station 101 operates as the signal is reliable. Thus, the term ordinary refers to the ordinary Inner Loop Power Control algorithm.

When DAGC power distortion is detected and the signal was determined to be unreliable in step 303, the ordinary power control algorithm is replaced by either:

Holding the UL TPC commands constant.

Toggling the UL TPC commands. If the choice is to select power up or power down the transmitting power may be held pseudo constant by altering the transmitted UL TPC command from the previous sent UL TPC command.

Restricting the number of allowed UL TPC up commands in order to minimize risk of power rush.

Step 305

The user equipment 103 adjusts its uplink power based on the received UL TPC commands from the base station 101.

Figure 4:
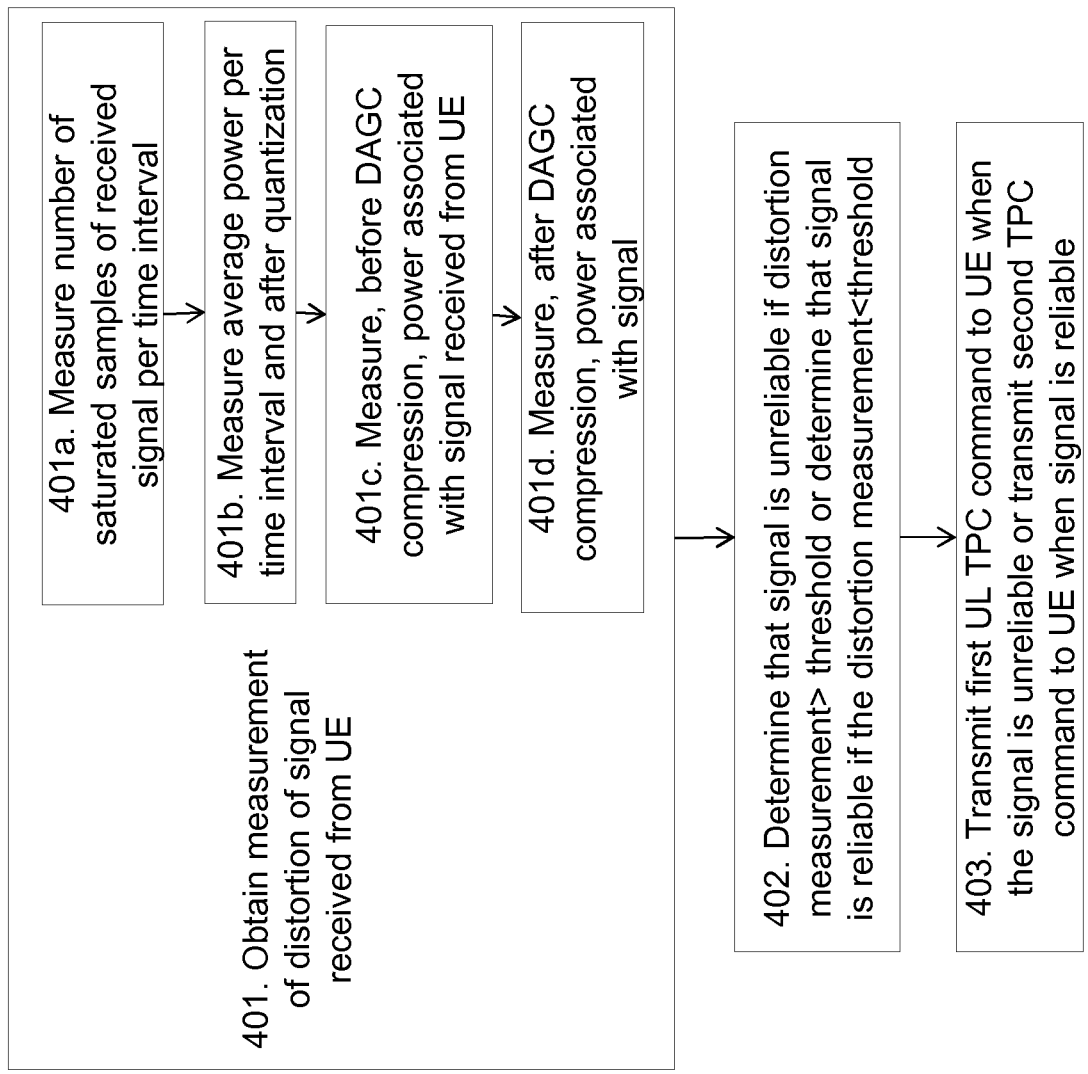
FIG. 4 is a flow chart illustrating embodiments of a method in a base station.

The method described above will now be described seen from the perspective of the base station 101. FIG. 4 is a flowchart describing the method in the base station 101, for transmitting the UL TPC command to the user equipment 103 in the communications network 100. The base station 101 may comprise be a baseband unit 201 and a DAGC 203. The communications network 100 may be based on WCDMA or based on CDMA. The method comprises the following steps to be performed by the base station 101, which steps may be performed in any suitable order:

Step 401

Figure 3:
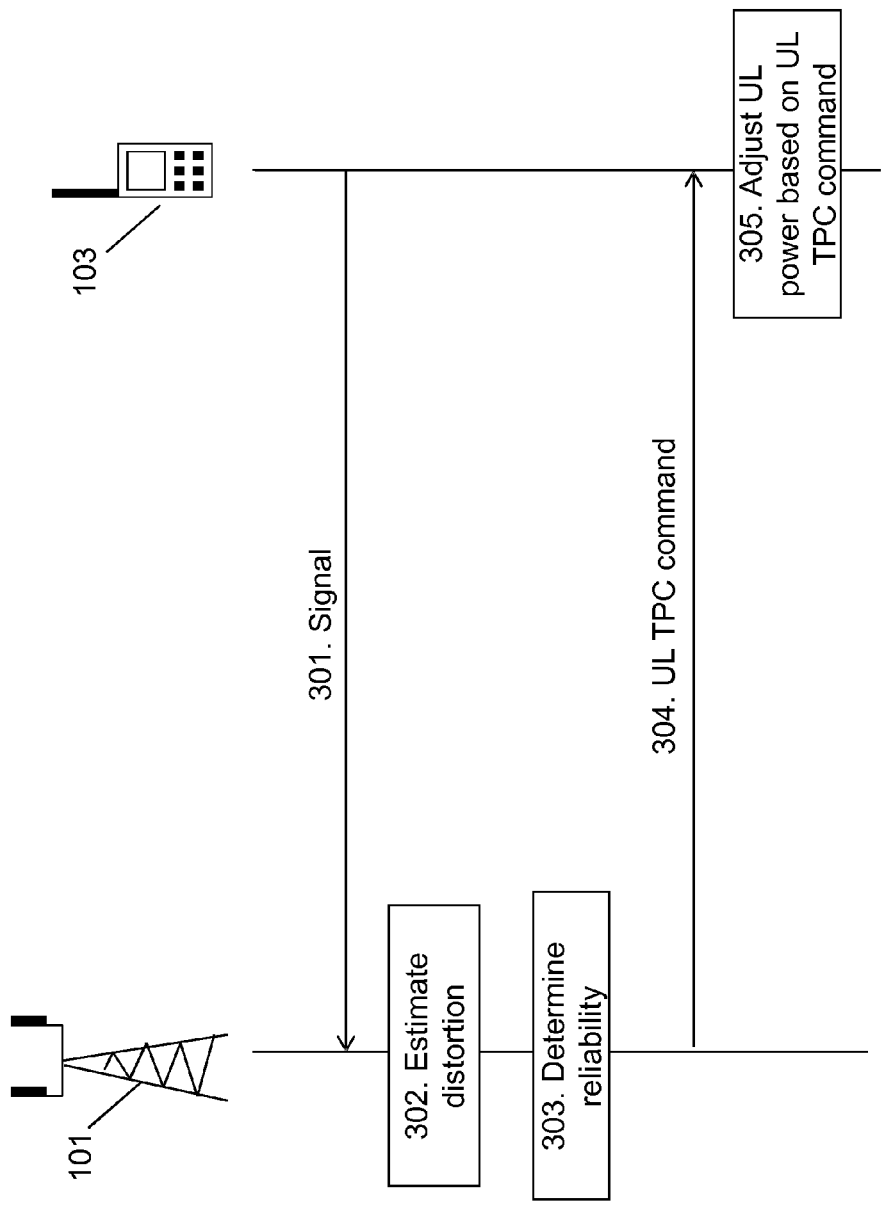
FIG. 3 is a signaling diagram illustrating embodiments of a method.

This step corresponds to step 302 in FIG. 3.

The base station 101 obtains a measurement of a distortion of a signal received from the user equipment 103. The signal is associated with a power to be controlled.

The received signal may be a compressed data signal 205 and the distortion measurement may comprise compression loss information 207 related to the compressed data signal.

Step 401a

This is a substep of step 401 and a step that is performed instead of step 401b. In some embodiments, the base station 101 measures a number of saturated samples of the received signal per time interval. The distortion measurement may comprise the number of saturated samples.

Step 401b

This is a substep of step 401 and a step that is performed instead of step 401a. In some embodiments, the base station 101 measures, per time interval and after quantization, an average power. The distortion measurement may comprise the measured distribution of average power per time interval.

Step 401c

This is a substep of step 401 and a step that is performed instead of steps 401a and 401b. In some embodiments, the base station 101 measures, before a DAGC compression, a power associated with the signal received from the user equipment 103, which power is to be controlled.

Step 401d

This is a substep of step 401 and a step that is performed after step 401c. In some embodiments, the base station 101 measures, after the DAGC compression, the power associated with the signal.

The measurement of the distortion may be based on the measurement of the power before the DAGC compression and the measurement of the power after the DAGC compression. In some embodiments, the measuring after the DAGC compression is performed after a time interval after the measuring before the DAGC compression is performed.

Step 402

This step corresponds to step 303 in FIG. 3.

The base station 101 compares the the distortion measurement with a threshold and determines that the signal is unreliable if the distortion measurement is above a threshold or determines that the signal is reliable if the distortion measurement is below the threshold.

The threshold may be associated with the number of saturated samples from step 401a. The threshold may be associated with the average power from step 401b.

Step 403

This step corresponds to step 304 in FIG. 3.

The base station 101 transmits a first UL TPC command to the user equipment 103 when the signal is determined to be unreliable or the base station 101 transmits a second TPC command to the user equipment 103 when the signal is determined to be reliable.

The first TPC command may comprises a plurality of constant TPC commands, or the first TPC command may comprise a plurality of toggled TPC commands or the first TPC command may comprise a predetermined number of TPC commands.

Figure 5:
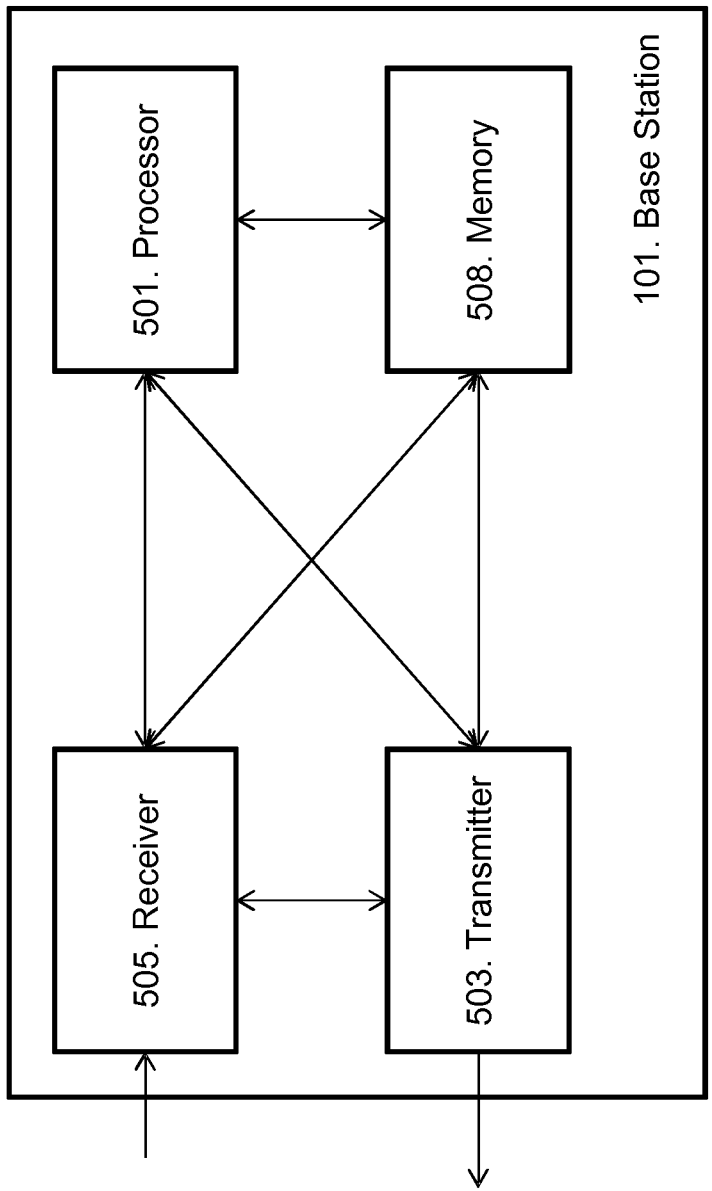
FIG. 5 is a schematic block diagram illustrating embodiments of a base station.

To perform the method steps shown in FIG. 4 for transmitting the UL TPC command to the user equipment 103 in the communications network 100 the base station 101 comprises an arrangement as shown in FIG. 5. In some embodiments, the communications network 100 is based on WCDMA or based on CDMA.

The base station 101 comprises a processor 501 configured to obtain a measurement of a distortion of a signal received from the user equipment 103. The signal is associated with a power to be controlled. The processor 501 is further configured to determine that the signal is unreliable if the distortion measurement is above a threshold or to determine that the signal is reliable if the distortion measurement is below the threshold. In some embodiments, the processor 501 is further configured to measure a number of saturated samples of the received signal per time interval. The distortion measurement may comprise the number of saturated samples, and the threshold may be associated with the number of saturated samples. In some embodiments, the processor 501 is further configured to measure, per time interval and after quantization, an average power. The distortion measurement may comprise the measured distribution of average power per time interval, and the threshold may be associated with the average power.

In some embodiments, the processor 501 is further configured to measure, before the DAGC compression, a power associated with the signal received from the user equipment 103, which power is to be controlled. The processor 501 may be further configured to measure, after the DAGC compression, the power associated with the signal. The measurement of the distortion may be based on the measurement of the power before the DAGC compression and the measurement of the power after the DAGC compression. The processor 501 may be further configured to perform the measuring after the DAGC compression after a time interval after the measuring before the DAGC compression is performed. The received signal may be a compressed data signal 205 and the distortion measurement may comprise compression loss information 207 related to the compressed data signal. The processor 501 comprises the DAGC 230 and the baseband unit 201 described in relation to FIG. 2 above.

The base station 101 comprises a transmitter 503 configured to transmit a first UL TPC command to the user equipment 103 when the signal is determined to be unreliable or to transmit a second TPC command to the user equipment 103 when the signal is determined to be reliable. The first TPC command may comprise a plurality of constant TPC commands, or the first TPC command may comprise a plurality of toggled TPC commands or the first TPC command may comprise a predetermined number of TPC commands.

In some embodiments, the base station 101 comprises a receiver 505 configured to receive the signal from the user equipment 103.

The base station 101 may further comprise a memory 508 comprising one or more memory units. The memory 508 is arranged to be used to store data, received signals, power level measurements, average power measurements, measured number of saturated samples per time interval, SIR, target SIR, information about distortion, the first UL TPC command, the second UL TPC command, threshold values, time periods, configurations, schedulings, and applications to perform the methods herein when being executed in the base station 101.

Those skilled in the art will also appreciate that the transmitter 503 and the receiver 505 described above may refer to a combination of analog and digital circuits, and/or one or more processors configured with software and/or firmware, e.g. stored in the memory 508, that when executed by the one or more processors such as the processor 501 as described below. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Alternative embodiments of the base station 101 may comprise additional components beyond those shown in FIG. 5 that may be responsible for providing certain aspects of the base station 101 functionality, including any of the functionality described above and/or any functionality necessary to support the embodiments herein.

The present mechanism for transmitting the UL TPC command to the user equipment 103 in a communications network 100 may be implemented through one or more processors, such as the processor 501 in the base station arrangement depicted in FIG. 5, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the base station 101. One such carrier may be in the form of a CD ROM disc. It is however feasible with other data carriers such as a memory stick. The computer program code may furthermore be provided as pure program code on a server and downloaded to the base station 101.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a base station for transmitting an UpLink Transmit Power Control (UL TPC) command to a user equipment in a communications network, the method comprising:
    obtaining a measurement of a distortion of a signal received from the user equipment, wherein the signal is associated with a power to be controlled;
    determining that the signal is unreliable if the distortion measurement is above a threshold or determining that the signal is reliable if the distortion measurement is below the threshold; and
    transmitting a first UL TPC command to the user equipment when the signal is determined to be unreliable or transmitting a second TPC command to the user equipment when the signal is determined to be reliable,
    wherein the obtaining the measurement of the distortion of the signal received from the user equipment further comprises:
    measuring, before a Digital Automatic Gain Control (DAGC) compression, a power associated with the signal received from the user equipment, which power is to be controlled;
    measuring, after the DAGC compression, the power associated with the signal; and
    wherein the measurement of the distortion is based on the measurement of the power before the DAGC compression and the measurement of the power after the DAGC compression.

2. The method according to claim 1, wherein the measuring after the DAGC compression is performed after a time interval after the measuring before the DAGC compression is performed.

3. The method according to claim 1, wherein the first TPC command comprises a plurality of constant TPC commands, or wherein the first TPC command comprises a plurality of toggled TPC commands, or wherein the first TPC command comprises a predetermined number of TPC commands.

4. The method according to claim 1, wherein the received signal is a compressed data signal and wherein the distortion measurement comprises compression loss information related to the compressed data signal.

5. The method according to claim 1, wherein the communications network is based on Wideband Code Division Multiple Access (WCDMA) or based on Code Division Multiple Access (CDMA).

6. A base station configured to transmit an UpLink Transmit Power Control (UL TPC) command to a user equipment in a communications network, the base station comprising:
    a processor configured to:
        obtain a measurement of a distortion of a signal received from the user equipment, wherein the signal is associated with a power to be controlled; and to
        determine that the signal is unreliable if the distortion measurement is above a threshold or to determine that the signal is reliable if the distortion measurement is below the threshold; and a transmitter configured to transmit a first UL TPC command to the user equipment when the signal is determined to be unreliable or to transmit a second TPC command to the user equipment when the signal is determined to be reliable, wherein the processor is further configured to:

measure, before a Digital Automatic Gain Control (DAGC) compression, a power associated with the signal received from the user equipment, which power is to be controlled; and to measure, after the DAGC compression, the power associated with the signal; and wherein the measurement of the distortion is based on the measurement of the power before the DAGC compression and the measurement of the power after the DAGC compression.

7. The base station according to claim 6, wherein the processor is further configured to perform the measuring after the DAGC compression after a time interval after the measuring before the DAGC compression is performed.

8. The base station according to claim 6, wherein the first TPC command comprises a plurality of constant TPC commands, or wherein the first TPC command comprises a plurality of toggled TPC commands, or wherein the first TPC command comprises a predetermined number of TPC commands.

9. The base station according to claim 6, wherein the received signal is a compressed data signal and wherein the distortion measurement comprises compression loss information related to the compressed data signal.

10. The base station according to claim 6, wherein the communications network is based on Wideband Code Division Multiple Access (WCDMA) or based on Code Division Multiple Access (CDMA).

* * * * *